US007739012B2

(12) United States Patent
Komaki et al.

(10) Patent No.: US 7,739,012 B2
(45) Date of Patent: Jun. 15, 2010

(54) AIR BAG SYSTEM

(75) Inventors: Hiroyuki Komaki, Kobe (JP); Kenichi Inoue, Kobe (JP); Yasushi Tani, Kobe (JP); Tsutomu Kondou, Toyota (JP)

(73) Assignee: Fujitsu Ten Limited, Kobe-shi (JP)

( * ) Notice: Subject to any disclaimer, the term of this patent is extended or adjusted under 35 U.S.C. 154(b) by 519 days.

(21) Appl. No.: 11/514,102

(22) Filed: Sep. 1, 2006

(65) Prior Publication Data
US 2007/0055429 A1   Mar. 8, 2007

(30) Foreign Application Priority Data
Sep. 6, 2005 (JP) ............................. 2005-258348

(51) Int. Cl.
*B60R 22/00* (2006.01)
*E05F 15/00* (2006.01)
*G05D 3/00* (2006.01)

(52) U.S. Cl. ............................... 701/45; 701/1; 701/29; 701/30; 701/31; 701/34; 701/36; 701/46; 701/47; 701/49; 280/735

(58) Field of Classification Search ................ 280/734, 280/735; 701/29, 31, 34, 45
See application file for complete search history.

(56) References Cited

U.S. PATENT DOCUMENTS

| 4,950,914 A * | 8/1990 | Kurihara et al. ............ 307/10.1 |
| 5,085,464 A * | 2/1992 | Behr et al. ................... 280/735 |
| 5,285,188 A * | 2/1994 | Yoshida ...................... 340/436 |
| 5,406,127 A * | 4/1995 | Furui et al. ................. 307/10.1 |
| 6,109,648 A * | 8/2000 | Luo et al. .................... 280/735 |
| 6,600,414 B2 * | 7/2003 | Foo et al. ..................... 340/440 |

(Continued)

FOREIGN PATENT DOCUMENTS

JP       A 5-178163       7/1993

(Continued)

OTHER PUBLICATIONS

Mar. 16, 2010 Office Action for Japanese Patent Application No. 2005-258348 (with English translation).

*Primary Examiner*—Khoi Tran
*Assistant Examiner*—Bhavesh V Amin
(74) *Attorney, Agent, or Firm*—Oliff & Berridge, PLC

(57) ABSTRACT

To achieve an air bag system in which a safing determination processing circuit can be implemented on one integrated circuit, the air bag system, which is equipped with first and second sensors (101, 103) for detecting a vehicle crash, and which outputs a signal for expanding an air bag when it is determined that a vehicle crash has occurred based on the outputs of the first and second sensors, comprises: a processing unit (3) for processing an output signal of the first sensor (101) by software; and a processing circuit (2) for processing an output signal of the second sensor (103) by hardware, wherein the processing unit (3) includes a non-activation fault diagnosis section (33) which, based on the output signal of the second sensor (103), detects a failure that can lead to non-activation of the air bag, and the processing circuit (2) includes an erroneous-activation fault diagnosis section (240) which, based on the output signal of the second sensor (103), detects a failure that can lead to erroneous activation of the air bag.

7 Claims, 5 Drawing Sheets

U.S. PATENT DOCUMENTS

2003/0155754 A1* 8/2003 Komaki et al. .............. 280/735

FOREIGN PATENT DOCUMENTS

| JP | A-06-066824 | 3/1994 |
|---|---|---|
| JP | U-07-009664 | 2/1995 |
| JP | A-2001-147167 | 5/2001 |
| JP | A 2001-206191 | 7/2001 |
| JP | A 2002-370609 | 12/2002 |
| JP | A-2004-243955 | 9/2004 |
| JP | A-2005-063054 | 3/2005 |

* cited by examiner

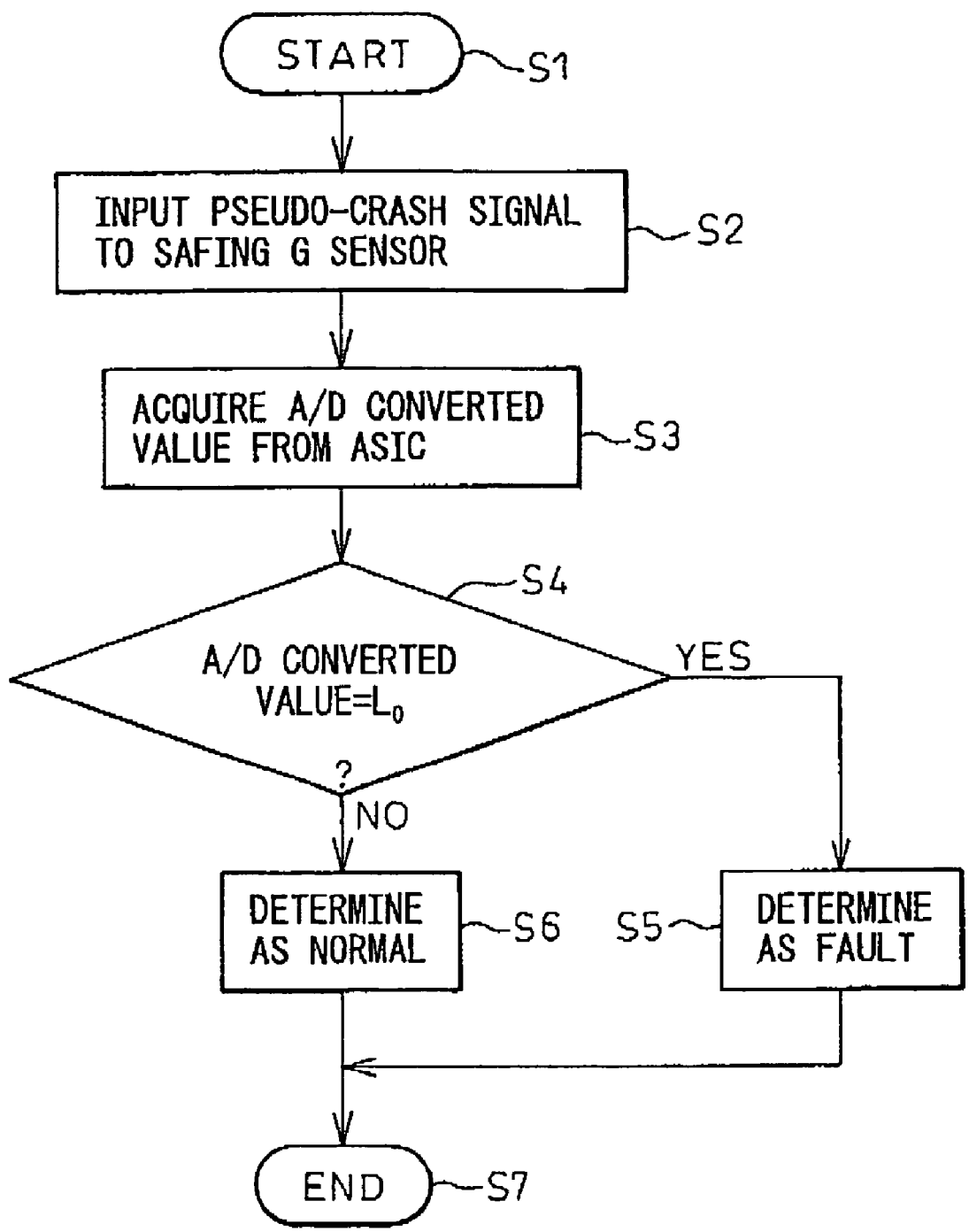

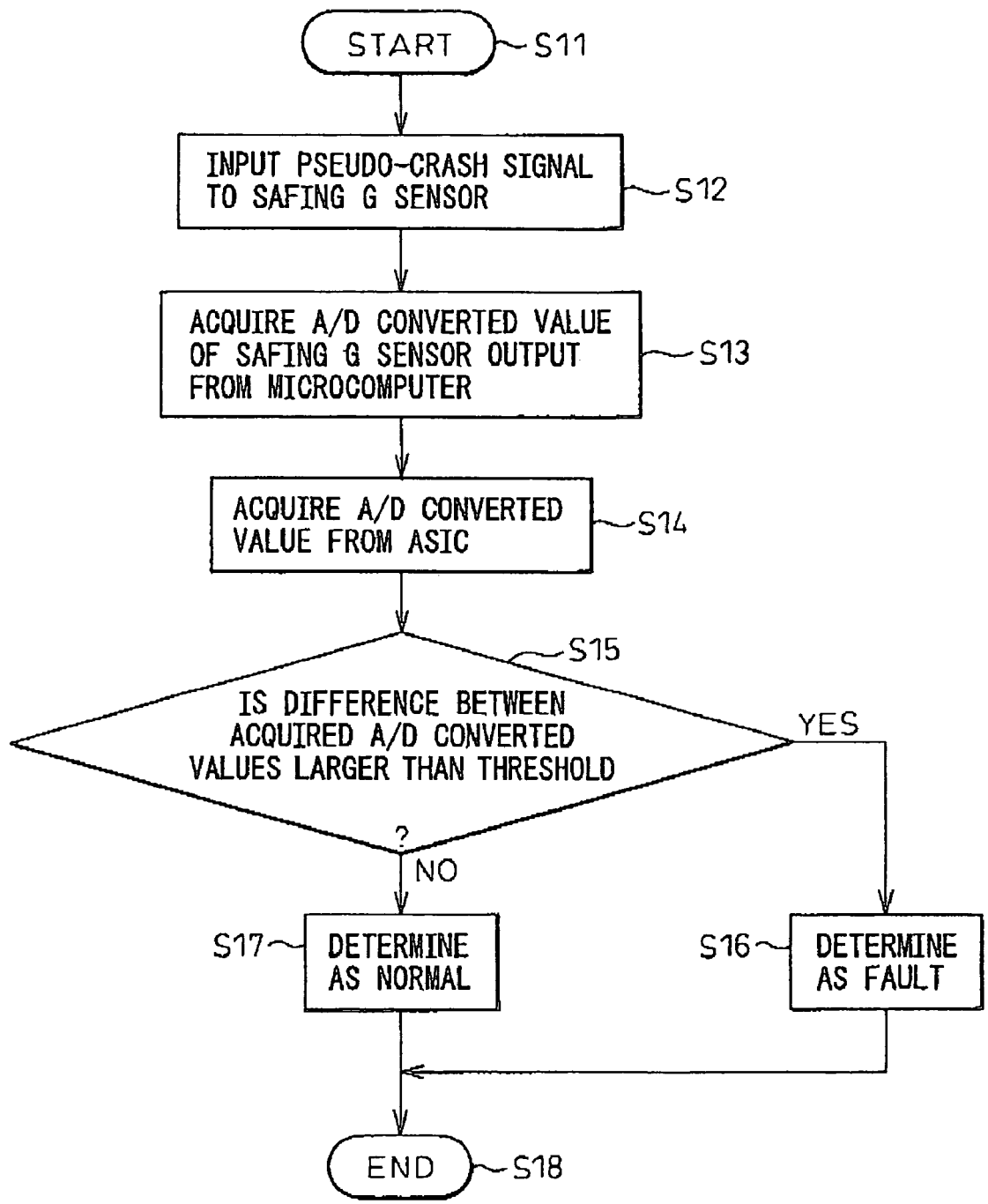

AIR BAG SYSTEM

CROSS-REFERENCE TO RELATED APPLICATION

This application claims priority from Japanese Patent Application No. 2005-258348 which was filed on Sep. 6, 2005.

BACKGROUND OF THE INVENTION

1. Field of the Invention

The present invention relates to an air bag system (air bag ECU) which expands an air bag for occupant protection by detecting the occurrence of a vehicle crash and, more particularly, to an air bag system which employs a safing system in determining the occurrence of a crash using an acceleration sensor.

2. Prior Art

Vehicles such as passenger cars have long been equipped with air bag systems that automatically expand air bags to protect occupants, in the event of a vehicle accident, by detecting an impact using electronic acceleration sensors. Such air bag systems employ a so-called safing system in which the determination as to whether to expand or not expand the air bag is made using not only a first channel (main crash determination line) comprising a main electronic acceleration sensor and an electronic circuit but also a second channel (safing line) that operates independently of the first channel in order to ensure safe air bag expansion in case of a malfunctioning of the first channel; more specifically, the system operates such that the air bag is expanded by determining that a vehicle crash has occurred only when the results of the determinations from the two channels match. Since the probability that both the main crash determination line and the safing line make erroneous determinations is extremely low, the above system works sufficiently effectively to prevent the danger of the air bag being erroneously expanded in a non-crash situation due to failure of the acceleration sensor or other electronic systems.

In the prior art, there is also an air bag system equipped with a self-diagnostic function that automatically diagnoses operational faults in various electronic systems in the air bag system, for example, at the time of ignition on, in order to reliably expand or not expand the air bag (for example, refer to Japanese Unexamined Patent Publication Nos. H05-178163, 2001-206191, and 2002-370609).

As these prior art air bag systems employ the safing system and incorporate self-diagnostic functions, electronic control becomes extremely complex in such systems. Accordingly, microcomputers capable of implementing a large number of control functions in software are used. Further, the sating system requires two microcomputers to implement, i.e., a microcomputer for use in the first channel for crash determination and a sub-microcomputer for use in the second channel for safing purposes. If the first and second channels were implemented in one microcomputer, then in the event of runaway of the microcomputer the two channels would become unable to make correct determinations, rendering the sating system meaningless.

FIG. 1 is a diagram showing the basic configuration of a prior art air bag ECU equipped with a safing system. In the figure, reference numeral 100 is the air bag ECU which includes a main electronic acceleration sensor (hereinafter called the G sensor) 101, a main microcomputer 102, a sating G sensor 103, a sub-microcomputer 104, an output circuit 105, and a communication IC 106. Here, the communication IC 106 has the function of providing the crash signals generated by front sensors 107 and satellite sensors 108, the former mounted in the right and left front end positions of the vehicle and the latter in both sides of the vehicle, to the main microcomputer 102 and sub-microcomputer 104 so that further detailed determinations (including the position and severity of the crash) can be made there; however, as the communication IC 106 is not a component that constitutes a feature of the present invention, a detailed description thereof will not be given here.

Reference numeral 109 is an electronic switch which is connected to an internal power supply 112, and which is turned on by an ignition signal from the main microcomputer 102 and supplies a current to an ignition circuit 110 in the output circuit 105 for igniting a squib 111. The output circuit 105 contains a gate circuit 113 which, based on a crash signal supplied from the main microcomputer 102 and a safing signal, generates a signal for activating the ignition circuit 110. The air bag ECU 100, the front sensors 107, the satellite sensors 108, and the squib 111 are located inside the vehicle 500.

In the air bag system of FIG. 1, the main microcomputer 102 analyzes the acceleration signal supplied from the main G sensor 101 and determines whether a vehicle crash has occurred or not; if it is determined that a crash has occurred, the main microcomputer 102 supplies a crash signal to the output circuit 105 and the switch 109. On the other hand, the sub-microcomputer 104 analyzes the acceleration signal supplied from the safing G sensor 103 and determines, on a channel different to that of the main microcomputer 102, whether a vehicle crash has occurred or not; if it is determined that a crash has occurred, the sub-microcomputer 104 supplies a safing signal to the output circuit 105.

The gate circuit 113 in the output circuit 105 outputs an ON signal to the ignition circuit 105 only when both the crash signal from the main microcomputer 102 and the safing signal from the sub-microcomputer 104 are input to it. Accordingly, if the main microcomputer 102, for example, runs out of control and outputs a false crash signal, as the safing signal is not output from the sub-microcomputer 104, the output circuit 101 is not activated, so that the air bag is not expanded. In the system of FIG. 1, erroneous activation of the air bag is prevented, unless both the main microcomputer 102 and the sub-microcomputer 104 run out of control simultaneously.

In the prior art air bag system shown in FIG. 1, the sub-microcomputer must be provided in addition to the main microcomputer in order to construct the above-described safing system. However, microcomputers are expensive items, and the requirement of two such expensive microcomputers has been a major factor that increases the cost of the air bag system. If the functions to be performed by one of the microcomputers can be implemented in a single IC (originally, one IC is provided for the ignition drive circuit), the cost of the air bag system can be substantially reduced; however, it is difficult to implement complex control functions such as crash determination and self-diagnosis in a single IC and, if such an IC is to be achieved, the cost may increase rather than decrease.

SUMMARY OF THE INVENTION

The present invention has been devised in view of the problem associated with the prior art air bag system, and an object of the invention is to provide an air bag system that can achieve a reduction in manufacturing cost by replacing one of the microcomputers, the microcomputer in the main crash determination channel or the microcomputer in the safing crash determination channel, by a single IC.

To solve the above problem, a first air bag system according to the present invention, which is equipped with first and second sensors for detecting a vehicle crash, and which outputs a signal for expanding an air bag when it is determined that a vehicle crash has occurred based on the outputs of the first and second sensors, comprises: a processing unit for processing an output signal of the first sensor by software; and a processing circuit for processing an output signal of the second sensor by hardware, wherein the processing unit includes a non-activation fault diagnosis section which, based on the output signal of the second sensor, checks for the presence of a non-activation fault in which, in a situation where the air bag is to be expanded, the second sensor outputs a signal that is contradictory to the situation, and the processing circuit includes an erroneous-activation fault diagnosis section which, based on the output signal of the second sensor, checks for the presence of an erroneous-activation fault in which, in a situation where the air bag is not to be expanded, the second sensor outputs a signal that is contradictory to the situation.

In a second air bag system according to the present invention, the first sensor is a first acceleration sensor, and the second sensor is a second acceleration sensor for safing purposes, wherein the processing unit is constructed from one microcomputer which includes, in addition to the non-activation fault diagnosis section, a crash determination section for making a crash determination by processing the output signal of the first acceleration sensor and a fault diagnosis section for diagnosing operational faults in the acceleration sensor and the crash determination section, and the processing circuit is constructed from one integrated circuit which includes, in addition to the erroneous-activation fault diagnosis section, a safing determination section for making a safing determination by processing the output signal of the safing second acceleration sensor.

Faults (failures) of electronics systems in an air bag system fall into two classes: failures that can lead to erroneous activation; and failures that can lead to non-activation. Failures that can lead to erroneous activation are electronic system failures that can cause the air bag to expand when a crash has not actually occurred, while failures that can lead to non-activation are electronic system failures that can create situations where the air bag is not expanded when the air bag must be expanded.

If a failure that can lead to erroneous activation is detected during the self diagnosis of the air bag system, some remedial action must be taken immediately to prevent the danger of the air bag being erroneously expanded, since this kind of failure can result in a serious situation. On the other hand, a failure that can lead to non-activation, if detected during the self diagnosis, can be addressed, for example, by providing a warning to the driver, since this kind of failure does not result in dangerous expansion of the air bag. Accordingly, failures that can lead to non-activation can be regarded as being one rank lower, in terms of the degree of seriousness, than failures that can lead to erroneous activation.

Therefore, the air bag system of the present invention is configured so that, of the self-diagnostic functions of the safing system, the function of detecting failures that can lead to non-activation (non-activation faults) is performed by the processing circuit that makes the sating crash determination (for example, by a hard-wired IC, not by a microprocessor which is susceptible to runaway), while the function of detecting failures that can lead to non-activation (non-activation faults) is transferred to the processing unit that makes the main crash determination. With this arrangement, the amount of circuitry of the processing circuit that makes the safing crash determination can be reduced, and therefore, the processing circuit can be implemented using an inexpensive IC or the like that processes information by hardware, not a microcomputer that processes information by software.

In the air bag system of the above configuration, the one integrated circuit further includes an output circuit for outputting an air bag firing signal based on a crash signal from the microcomputer and a signal from the safing determination section.

The one microcomputer further includes an output disabling section for disabling the output of the safing determination section of the one integrated circuit when a fault is detected by the non-activation fault diagnosis section.

The one microcomputer outputs a pseudo-crash signal to the safing G sensor, and performs the non-activation fault diagnosis based on a signal that the safing G sensor outputs in response to the pseudo-crash signal.

The one microcomputer outputs a signal for disabling the output of the output circuit to the output circuit in the one integrated circuit at the same time that the pseudo-crash signal is output to the safing G sensor.

The one microcomputer includes a monitoring section for monitoring the output of the safing G sensor, and performs the non-activation fault diagnosis based on a result of the monitoring.

The one microcomputer includes a first A/D converter for A/D converting the output of the first acceleration sensor, and the one integrated circuit includes a second A/D converter for A/D converting the output of the safing G sensor, wherein the monitoring in the one microcomputer is performed using the first A/D converter.

The non-activation fault diagnosis section of the one microcomputer is equipped with a function for monitoring the output of the second A/D converter of the one integrated circuit.

The safing determination section includes a plurality of safing determination equations, an appropriate one of which is externally selectable, and a plurality of threshold values, an appropriate one of which is externally selectable.

The plurality of safing determination equations and the plurality of threshold values can be selected by adjusting an externally applied voltage.

Selection from among the safing determination equations and the threshold values is made based on the type of vehicle in which the air bag system is mounted.

In the air bag system of the present invention, as the non-activation fault diagnosis originally performed in the safing channel is performed in the main crash determination channel as described above, the amount of circuitry of the safing processing circuit can be greatly reduced. Accordingly, the safing processing circuit can be implemented using an inexpensive integrated circuit that processes information by hardware, and thus the number of microcomputers can be reduced, achieving a corresponding reduction in the cost of the air bag system.

BRIEF DESCRIPTION OF THE DRAWINGS

FIG. 4 is a diagram showing a flowchart for detecting a non-activation state of a safing G sensor; and FIG. 5 is a diagram showing a flowchart for detecting a fault in an A/D converter.

DESCRIPTION OF THE PREFERRED EMBODIMENTS

Figure 1:
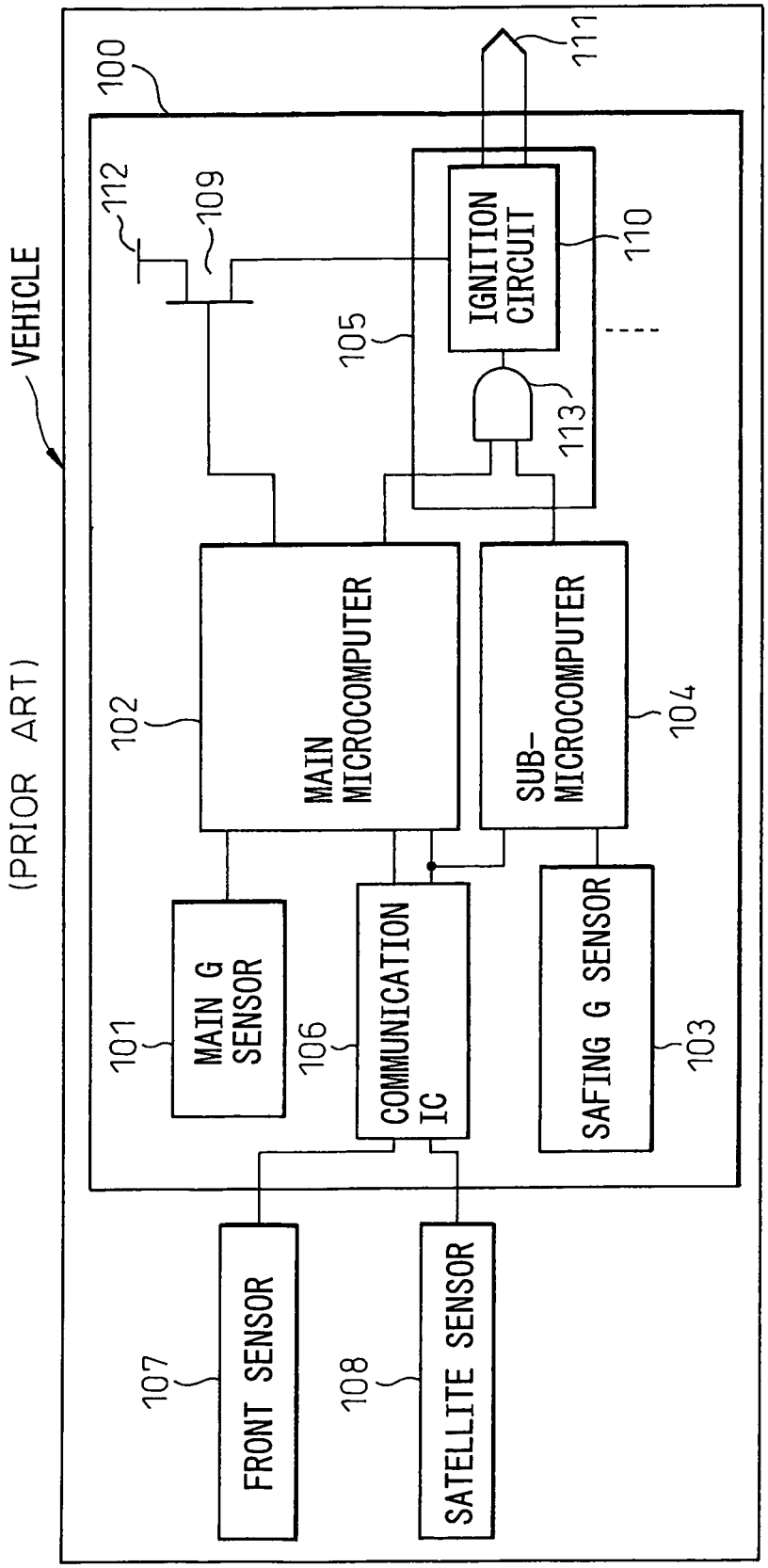
FIG. 1 is a block diagram showing the basic configuration of a prior art air bag system.
Figure 2:
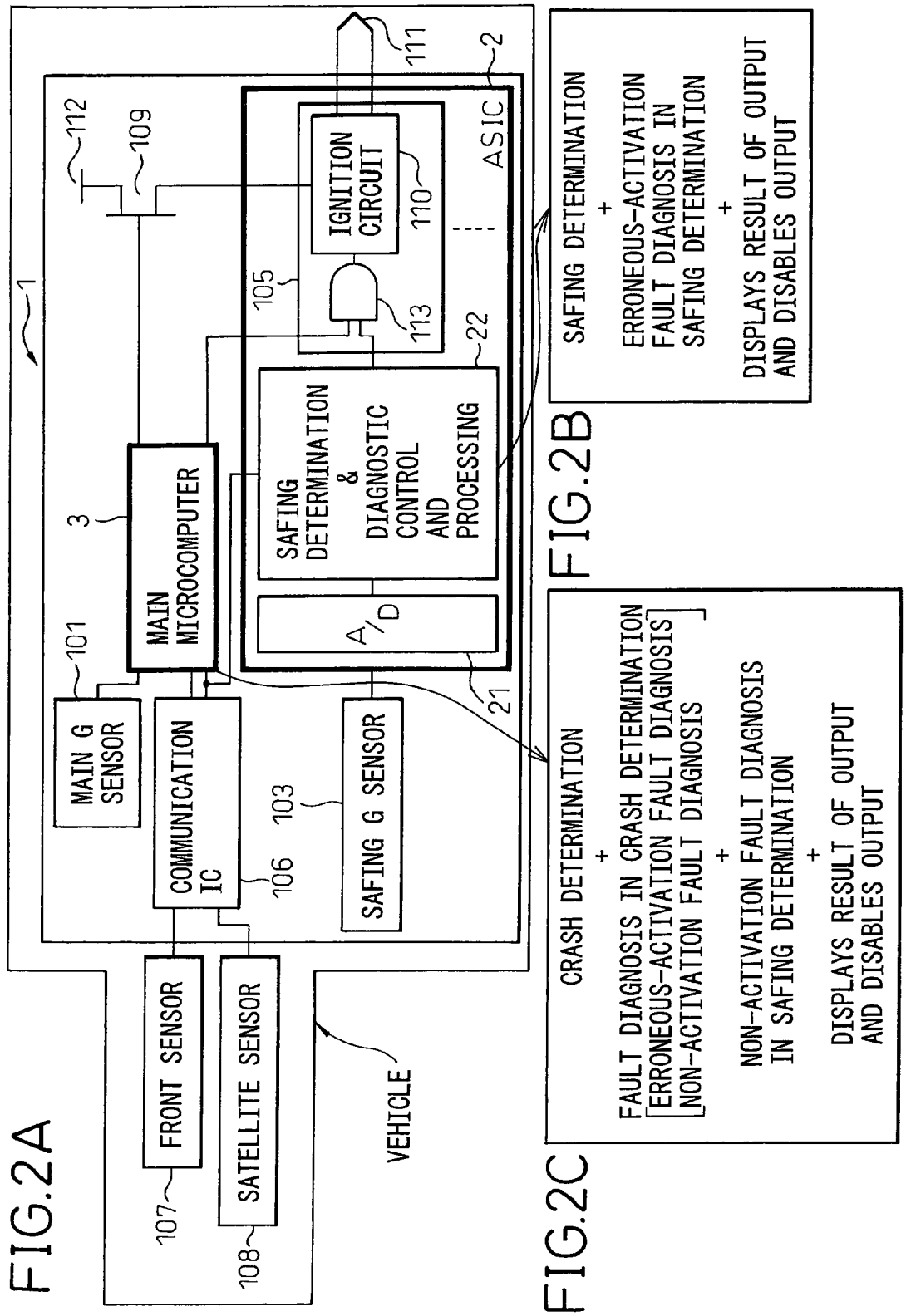
FIG. 2A is a block diagram showing the basic configuration of an air bag system according to one embodiment of the present invention.
FIG. 2B is a diagram showing the processing performed in a computing circuit in FIG. 2A.
FIG. 2C is a diagram showing the processing performed in a main microcomputer in FIG. 2A.

FIG. 2 shows the configuration of an air bag ECU 1 according to one embodiment of the present invention. In the drawings hereinafter given, the same reference numerals, as those in FIG. 1, designate the same or similar elements, and the description of such elements will not be repeated. As shown in FIG. 2A, in the air bag ECU 1 according to the present embodiment, the safing processing section for processing the output of the safing G sensor 103 and the output circuit for air bag firing are implemented on a single ASIC 2. That is, the ASIC 2 contains an A/D converter 21 for A/D converting the analog output of the safing G sensor 103, a computing circuit 22 for performing operations for a safing determination and fault diagnostic control and processing, and the output circuit 105.

The main G sensor is provided within the air bag ECU 1, has an element that deforms according to the acceleration, and outputs a signal proportional to the acceleration. The safing sensor, which is provided separately from the main G sensor, operates on the same principle as the main G sensor but operates independently of the microcomputer, so that the safing sensor is unaffected by a runaway of the microcomputer.

FIG. 2B shows the processing performed by the computing circuit 22 in the ASIC 2. As shown, the computing circuit 22 has a circuit function for making a safing crash determination, an erroneous-activation fault diagnostic function for detecting, in the fault diagnosis of the safing determination circuit, failures that can lead to erroneous activation of the air bag, a function for disabling its output to the output circuit 105 based on the result of the diagnosis, and a display control function for notifying the user of the result of the diagnosis by means of a buzzer, lamp, or the like.

As shown in FIG. 2C, the main microcomputer 3 has an crash determination function for making an crash determination based on the acceleration signal from the main G sensor 101, a fault diagnostic function for diagnosing any fault occurring in the crash determination function (including erroneous-activation fault diagnosis and non-activation fault diagnosis), a non-activation fault diagnostic function for detecting, in the fault diagnosis of the safing determination, failures that can lead to non-activation of the air bag, a function for disabling its output to the output circuit 105 based on the result of the diagnosis, and a display control function for notifying the user of the result of the diagnosis by means of a buzzer, lamp, or the like.

As described above, the feature of the air bag system according to the present embodiment is that, of the fault diagnostic functions that were performed by the safing sub-microcomputer in the prior art system, the non-activation fault diagnostic function for detecting failures that can lead to non-activation of the air bag has been transferred to the main microcomputer 3. As the main microcomputer 3 has sufficient processing capacity, it can perform the non-activation fault diagnosis for safing determination in addition to the main crash determination and its fault diagnosis. Further, there will be no problem if the non-activation fault diagnostic function is transferred from the ASIC 2 to the main microcomputer 3, because the function is to detect a non-activation fault whose degree of seriousness is one rank lower than an erroneous-activation fault, as earlier described. On the other hand, the erroneous-activation fault diagnosis must be processed directly in the ASIC 2 because, if the output of the output circuit is not disabled immediately after the detection of the fault, accidental air bag expansion may result which can cause injury to the occupant.

When the non-activation fault diagnostic function for detecting failures that can lead to non-activation of the air bag is performed, not in the safing ASIC 2, but in the main microcomputer 3 as described above, the processing capability of the ASIC 2 can be greatly reduced and, as a result, the safing circuit and the output circuit can be implemented on a single IC as the ASIC 2.

Table 1 shows examples of fault diagnostic items in the safing line and the part where the fault diagnosis of each item is to be performed, i.e., the ASIC 2 or the microcomputer 3.

TABLE 1

| | Diagnostic item | Description | Mode | Part responsible for diagnosis |
|---|---|---|---|---|
| Fault 1 | Safing G sensor output Hi fault | G sensor output, which is usually 2.5 V, is stuck at 5 V. | Erroneous activation | ASIC |
| Fault 2 | Safing output circuit ON fault | Safing determination state in the ASIC is ON when it should be OFF. | Erroneous activation | ASIC |
| Fault 3 | Safing G sensor non-activation fault | G sensor detects acceleration, but G sensor internal circuit does not produce an output. | Non-activation | Microcomputer |

The above faults are only examples, and it will be appreciated that there are various other erroneous-activation faults and non-activation faults.

As shown in Table 1, fault 1 and fault 2 concern the case where the safing G sensor or the safing determination circuit in the ASIC outputs a crash signal when a vehicle crash has not actually occurred; if such a false signal is output, and if a crash signal is also output from the main microcomputer 3, the air bag will be erroneously expanded. Abrupt expansion of the air bag during normal driving would be very dangerous; therefore, when such a fault is detected, some remedial action must be taken immediately to prevent erroneous activation of the air bag. Accordingly, the diagnosis of the faults 1 and 2 in the sating line is performed directly within the ASIC, and measures such as disabling the output of the output circuit are taken based on the result of the diagnosis.

On the other hand, fault 3 concerns the case where, even when the safing G sensor 103 detects acceleration, an acceleration output cannot be obtained because of a failure of its internal circuit; in this case, the air bag does not expand. Accordingly, if such a fault is detected during the fault diagnosis, it is not necessary to immediately take remedial action such as disabling the output. Therefore, in the present invention, the diagnosis of such a fault is performed in the microcomputer. Here, provisions may be made so that, if the fault is detected by the microcomputer, the result is transferred to the ASIC to disable the operation of the ASIC.

Figure 3:
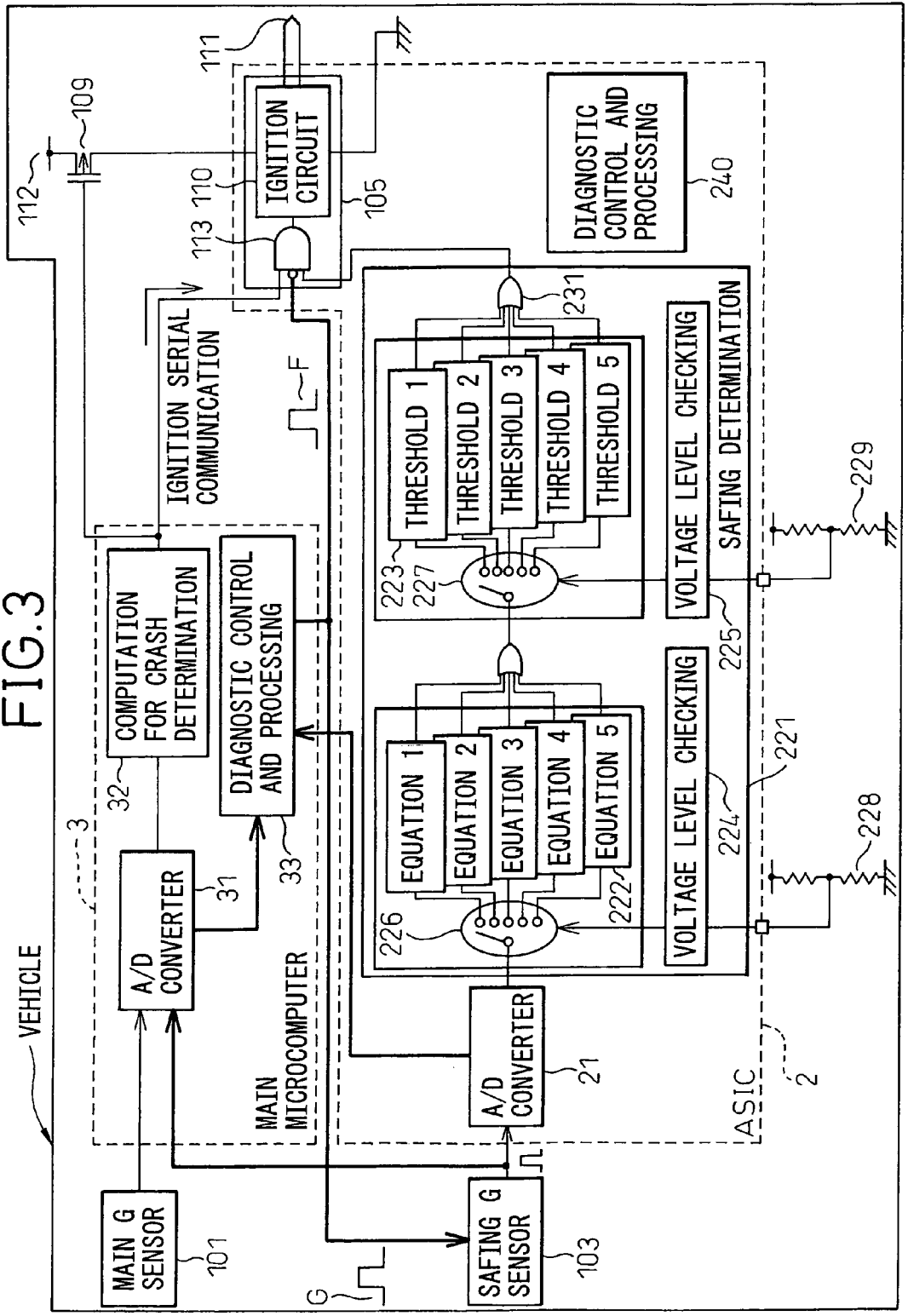
FIG. 3 is a block diagram showing the basic configuration of an air bag system according to another embodiment of the present invention.

FIG. 3 is a diagram showing the configuration of the air bag system, especially the microcomputer 3 and the ASIC 2, according to another embodiment of another invention. In this embodiment, an operational fault of the A/D converter 21 in the safing line (non-activation fault) and internal circuit fault of the safing G sensor 103 (non-activation fault) are diagnosed in the microcomputer 3. Further, the computing circuit 22 (see FIG. 2) in the safing line comprises a safing determination section 221 and a diagnostic control and processing section 240. The safing determination section 221 is configured to be able to change the criteria for sating determination according to various conditions. This configuration is effective when applying the same air bag system to various different types of vehicle. The diagnostic control and processing section 240 has the function of diagnosing erroneous-activation faults, as in the case of the air bag system of FIG. 1.

As shown in FIG. 3, in the microcomputer 3, an A/D converter 31 for converting an analog signal output from the main G sensor 101 into a digital signal, a computing section 32 for computing G for crash determination, and a fault diagnostic control and processing section 33 are incorporated (programmed) as software. The A/D converter 31 is also configured to be able to accept the output of the safing G sensor 103. The fault diagnostic control and processing section 33 is configured to perform not only the erroneous-activation fault diagnosis and non-activation fault diagnosis in the main crash determination channel but also the non-activation fault diagnosis in the safing channel and to perform appropriate processing based on the results of the diagnoses.

The diagnostic control and processing section 33 in the microcomputer 3 has the function of outputting a pseudo-crash signal to the safing G sensor 103. It also has the function of acquiring, from the A/D converter 21, the A/D converted value of the acceleration signal that the sensor 103 generated in response to the pseudo-crash signal G. If the output of the A/D converter 21 is low when the pseudo-crash signal G is supplied to the safing G sensor 103, the diagnostic control and processing section 33 in the microcomputer 3 determines that the sensor 103 is not functioning.

Here, at the same time that the pseudo-crash signal G is output to the sensor 103, the diagnostic control and processing section 33 outputs an output disable signal F to the output circuit 105 in order to prevent the air bag from being erroneously expanded by the ASIC 2 mistaking the pseudo-crash signal for a true crash signal in the safing determination and thereby outputting a signal to the output circuit 105.

The diagnostic control and processing section 33 in the microcomputer 3 has the function of performing the erroneous-activation fault diagnosis and non-activation fault diagnosis in the main crash determination channel, and hence outputs a pseudo-crash signal to the main G sensor 101, but this configuration is the same as that of the prior art air bag system and will not be described further.

FIG. 4 is a flowchart showing a diagnostic procedure for detecting a non-activation state of the safing G sensor 103, that is, the fault in which, even when the safing G sensor 103 detects acceleration, the sensor output is stuck at low due to a failure of its internal circuit. When the ignition switch of the vehicle is turned on, self diagnosis of the air bag is performed for a predetermined length of time. There are various kinds of diagnoses; first, as a subroutine for diagnosing the non-activation state of the safing G sensor 103 is started (step S1), the diagnostic control and processing section 33 in the microcomputer 3 outputs a pseudo-crash signal G to the safing G sensor 103 (step S2). Next, the diagnostic control and processing section 33 acquires the output of the A/D converter 21 from the ASIC 2 (step S3), and detects whether the acquired value is low or not (step S4). If the acquired value is low even when the pseudo-crash signal G is output (YES in step S4), it is determined that the internal circuit of the sating G sensor 103 is faulty, thus determining the fault state (step S5); on the other hand, if the acquired value is high (NO in step S4), this means that the circuit is functioning correctly, and the situation is thus determined to be normal (step S6), after which the process is terminated (step S7).

FIG. 5 is a flowchart showing a procedure for operating the microcomputer 3 to check the operation of the A/D converter 21 in the ASIC 2. When a subroutine for checking the operation is started (step S11), the diagnostic control and processing section 33 in the microcomputer 3 supplies a pseudo-crash signal G to the sating G sensor 103 (step S12). When the safing G sensor 103 outputs a signal in response to the pseudo-crash signal, the output signal is supplied to the A/D converter 31 in the microcomputer 3, and the resulting A/D converted value is acquired (step S13). Further, the A/D converted value output from the A/D converter 21 in the ASIC 2 is also acquired (step S14), and the two acquired values are compared (step S15).

If the result of the comparison shows a value larger than a predetermined threshold value (YES in step S15), it is determined that the operation of the A/D converter 21 is faulty, thus determining the fault state (step S16). On the other hand, if, in step S15, the two acquired values are equal to each other or their difference is smaller than the threshold value (NO in step S15), the A/D converter 21 can be diagnosed as functioning correctly, and the situation is thus determined as being normal (step S17), after which the process is terminated (step S18).

In the process for detecting a fault in the A/D converter in the ASIC as well as the process for detecting the non-activation state of the sating G sensor, at the same time that the pseudo-crash signal is output to the safing G sensor 103, the diagnostic control and processing section 33 outputs an output disable signal F to the gate circuit 113 in the ASIC 2 in order to prevent the output circuit 105 from being driven and erroneously causing the air bag to expand when in the diagnostic mode.

Next, the configuration of the safing determination section 221 in the ASIC 2 will be described. The criteria for safing determination differ depending on the type of vehicle, but in the prior art, since the safing determination is done using a microcomputer, the same air bag ECU can be adapted for use with various types of vehicle by only changing the microcomputer program. However, when the safing determination section 221 is incorporated into the ASIC 2, the versatility of the air bag ECU achieved by changing the program is lost.

To address this, in the air bag ECU according to the present invention shown in FIG. 3, a plurality of safing determination equations 222 and a plurality of threshold values 223 are provided in the safing determination section 221 so that appropriate ones can be selected according to the externally applied voltage. In the figure, reference numerals 224 and 225 are voltage level checking sections, and 226 and 227 are switching devices for selecting an appropriate equation 222 and an appropriate threshold value 223 according to the voltage level. The voltage level checking sections 224 and 225 are connected to external voltage applying devices 228 and 229, respectively. Reference numerals 230 and 231 are gate devices.

The equations 222 are actually digital filter circuits, and filter coefficients that determine delay times, etc. differ from one equation to another. The threshold values 223 each actually comprise a reference voltage (threshold value) and a comparator, and are each constructed to compare the value of the corresponding equation, input via the gate circuit 230, with the reference voltage and to output a signal when the input value is greater than the reference voltage.

Accordingly, by setting the external voltage applying devices 228 and 229 to a value that matches the type of vehicle at the time of manufacture, the equation and the threshold value that match the type of vehicle are selected and set by the switch devices 226 and 227, respectively. In this way, the same air bag ECU can be adapted for use with various different types of vehicle by just changing the external voltage setting, and a versatility comparable to that of the prior art air bag system using the sub-microcomputer can thus be maintained.

What is claimed is:

1. An air bag system which is equipped with first and second acceleration sensors for detecting a vehicle crash, and which outputs a signal for expanding an air bag when it is determined that a vehicle crash has occurred based on outputs of said first and second acceleration sensors, said air bag system comprising:
    a microcomputer comprising:
        a crash determination section for making a crash determination by processing the output signal of said first acceleration sensor; and
        a fault diagnosis section for diagnosing operation faults in said first acceleration sensor and said crash determination section; and
    an integrated circuit comprising:
        a safing determination section for making a safing determination by processing an output signal from said second acceleration sensor;
        an erroneous-activation fault diagnosis section which, based on an output signal generated by activating said second acceleration sensor with a pseudo crash signal from said microcomputer, checks for the presence of an erroneous-activation fault in which, in a situation where said air bag is not to be expanded, said second acceleration sensor outputs a signal that is contradictory to said situation; and
        an output circuit for outputting an airbag firing signal based on a crash signal from said microcomputer and a signal from said safing determination section;
    said microcomputer further comprising a non-activation fault diagnosis section which, based on an output signal generated by activating said second acceleration sensor with said pseudo crash signal from said microcomputer, checks for the presence of a non-activation fault in which, in a situation where said air bag is to be expanded, said second acceleration sensor outputs a signal that is contradictory to said situation.

2. An air bag system as claimed in claim 1, wherein said microcomputer further includes an output disabling section for disabling the output of said safing determination section of said integrated circuit when a fault is detected by said non-activation fault diagnosis section.

3. An air bag system as claimed in claim 1, wherein said microcomputer outputs a signal for disabling the output of said output circuit to said output circuit in said integrated circuit at the same time that said pseudo-crash signal is output to said second acceleration sensor.

4. An air bag system as claimed in claim 1, wherein said microcomputer includes a monitoring section for monitoring the output of said second acceleration sensor, and performs said non-activation fault diagnosis based on a result of said monitoring.

5. An air bag system as claimed in claim 4, wherein said microcomputer includes a first A/D converter for A/D converting the output of said first acceleration sensor, and said integrated circuit includes a second A/D converter for A/D converting the output of said second acceleration sensor, and wherein said monitoring in said microcomputer is performed using said first A/D converter.

6. An air bag system as claimed in claim 5, wherein said non-activation fault diagnosis section of said microcomputer is equipped with a function for monitoring the output of said second A/D converter of said integrated circuit.

7. An air bag system as claimed in claim 3, wherein said microcomputer includes a monitoring section for monitoring the output of said second acceleration sensor, and performs said non-activation fault diagnosis based on a result of said monitoring.

* * * * *